(12) United States Patent
Erickson et al.

(10) Patent No.: US 6,266,931 B1
(45) Date of Patent: Jul. 31, 2001

(54) SCREW DRIVE ROOM SLIDEOUT ASSEMBLY

(75) Inventors: John Scott Erickson, Roscoe; Damon Dirk Shaw, Byron; Bryce Joel Bulthaus, Rockford, all of IL (US)

(73) Assignee: Atwood Industries, Inc., Rochester Hills, MI (US)

( * ) Notice: Subject to any disclaimer, the term of this patent is extended or adjusted under 35 U.S.C. 154(b) by 0 days.

(21) Appl. No.: 09/329,982

(22) Filed: Jun. 10, 1999

(51) Int. Cl.[7] .............................. E04B 1/343; B60P 3/34
(52) U.S. Cl. .......................... 52/67; 296/165; 296/175; 296/26.01; 296/26.13
(58) Field of Search .......................... 52/67; 296/26.12, 296/26.13, 165, 171, 175, 26.01

(56) References Cited

U.S. PATENT DOCUMENTS

| | | |
|---|---|---|
| 1,521,635 | 1/1925 | Lewis . |
| 2,193,352 | * 3/1940 | Thomas ............................. 52/67 X |
| 2,704,223 | 3/1955 | Houdart . |
| 2,813,747 | 11/1957 | Pice . |
| 2,822,212 | 2/1958 | Frey . |
| 3,512,315 | * 5/1970 | Vitalini ................................... 52/67 |
| 4,253,283 | * 3/1981 | May ....................................... 52/67 |
| 5,154,469 | 10/1992 | Morrow . |
| 5,237,782 | 8/1993 | Cooper . |
| 5,332,276 | 7/1994 | Blodgett, Jr. . |
| 5,333,420 | 8/1994 | Eden . |
| 5,491,933 | 2/1996 | Miller et al. . |
| 5,570,924 | 11/1996 | Few et al. . |
| 5,577,351 | 11/1996 | Dewald, Jr. et al. . |
| 5,586,802 | 12/1996 | Dewald, Jr. et al. . |
| 5,607,134 | 3/1997 | Corning et al. . |
| 5,634,683 | 6/1997 | Young . |
| 5,658,032 | * 8/1997 | Gardner ............................. 296/26.01 |
| 5,758,918 | 6/1998 | Schneider et al. . |
| 5,787,650 | 8/1998 | Miller et al. . |
| 5,833,296 | 11/1998 | Schneider . |
| 5,857,733 | 1/1999 | Dewald, Jr. et al. . |

\* cited by examiner

*Primary Examiner*—Laura A. Callo
(74) *Attorney, Agent, or Firm*—Banner & Witcoff

(57) ABSTRACT

A low-cost, compact room slideout assembly is provided for driving a sliding element, such as a floor, and comprises at least one motor having a motor output pinion rotatable about a first axis, a drive screw operatively connected to the motor output and rotatable about the first axis, and a driving member, such an elongate ram adapted to be attached to the sliding element. The ram travels along the first axis between extended and retracted positions in response to rotation of the motor output shaft. Preferably operatively connected between the motor output shaft and the drive screw is a speed reducing gearbox with an output shaft rotatable about the first axis, and a 90 degree gearbox operatively connected to the drive screw and rotatable about the first axis. The 90 degree gearbox preferably also has a second output member which is rotatable about a second axis perpendicular to the first axis. The 90 degree gearbox can comprise a series of bevel gears. In certain preferred embodiments a pair of screws and a pair of corresponding rams may be employed, with a cross shaft connecting the first 90 degree gearbox to a second 90 degree gearbox.

30 Claims, 9 Drawing Sheets

SCREW DRIVE ROOM SLIDEOUT ASSEMBLY

FIELD OF THE INVENTION

The present invention generally relates to an improved room slideout assembly, and more particularly to a room slideout design using a screw drive mechanism.

BACKGROUND OF THE INVENTION

Room slideout assemblies are used where it is desirable to have a room or compartment which is retractable and extendable, and can be found in recreational vehicles including, for example, Class A motor homes and some towable vehicles. A room slideout assembly can provide the occupant with the choice of additional space within the vehicle, often when the vehicle is parked. Then, when the vehicle is to be moved, the room slideout assembly can retract the room so that the vehicle is sufficiently narrow to permit driving the vehicle on normal highways.

Room slideout assemblies for control of a telescoping room have been constructed using a wide variety of designs. Known approaches include a rack and pinion design as well as the similar sprocket and hole design. In such designs elongate members, often referred to as rams or tubes, are attached to a sliding floor. A motor imparts rotary motion to a drive member such as the pinion or the sprocket, and the drive member urges the rams to move between a closed position and an extended position. The rams are typically attached to a sliding floor which is mounted over a fixed floor. The sliding floor may have walls of the room attached to it. An outer housing is typically provided in which the ram travels. The outer housing is attached to the fixed floor, often at or near a support frame.

Another known room slideout design uses a motor driven drive screw mounted in a central position between a pair of rams, with a motor mounted near one of the rams. Rotation of the drive screw moves a crosslink. The crosslink is rigidly connected to the rams so that the rams travel with the crosslink. A connecting shaft and gearbox link the motor to the drive screw. A cross shaft has gear teeth on it which engage openings on the ram. However, instead of acting as a driving member, the gear teeth and cross shaft are merely stabilization members.

Such known room slideout assemblies are relatively expensive and difficult to assemble. Moreover, space under the fixed floor for the room slideout assembly is restricted by, for example, outrigger overhanging, frame width and plumbing locations, etc. The location of the screw drive, the gears or the sprockets can interfere with such other components and vice versa. It would be highly advantageous to provide a room slideout assembly of compact design which is relatively insensitive to customer variations in componentry mounted below the floor.

In addition to problems with cost, complexity and customer variation in the location of under-floor mounted hardware, known room slideout assemblies, or slideouts, typically have other problems. Known rack and pinion slideout designs require a secondary brake to hold the room slideout assembly in position when the motor is shut off. It would be highly advantageous to provide a room slideout assembly which does not require a secondary brake, thereby providing smooth operation at reduced overall cost.

In view of the foregoing, it is an object of the present invention to provide a room slideout assembly of compact and low cost design. It is yet another related object of the present invention to provide a low friction, smooth running room slideout device which is highly reliable in operation.

SUMMARY OF THE INVENTION

In accordance with these and other objects, there is provided a room slideout assembly comprising at least one drive motor having a motor output pinion which rotates about a first axis, a drive screw operatively connected to the motor output pinion and also rotatable about the first axis, and an elongate ram adapted to be attached to a sliding element such as a sliding floor, wherein the ram travels along the first axis between extended and retracted positions in response to rotation of the drive screw. The motor output pinion is preferably coupled with a speed reducing gearbox such as a planetary gearbox. The speed reducing gearbox has a coupling shaft assembly which also rotates about the first axis, and is coupled to the drive screw. Preferably the ram travels in an outer housing attached to a fixed floor or a structural frame positioned below the fixed floor, and the motor and speed reducing gearbox are positioned within the outer housing, significantly reducing the amount of space required for the room slideout assembly.

In accordance with another aspect, a gearbox is connected between the drive screw and the speed reducing gearbox and is provided with a first gear rotatable about the first axis and a second gear which rotates perpendicular to the first axis. The second gear can, in certain preferred embodiments, connect the gearbox via a cross shaft to a second gearbox which is in turn attached to a second drive screw. The second drive screw drives a second ram attachable to the sliding floor. In this manner operation of the motor or motors drives both rams substantially simultaneously. Each gearbox can comprise a series of bevel gears. Preferably, the first and second 90 degree gearboxes are identical and one is rotated 180 degrees from the other so that the bevel gears which each rotate coaxially with a corresponding drive screw rotate in the same direction with respect to one another.

In accordance with another aspect of at least certain preferred embodiments, a room slideout assembly is provided wherein the outer housing is eliminated and the ram extends above the structural frame into a channel in the fixed floor.

From the foregoing disclosure and the following more detailed description of various preferred embodiments it will be apparent to those skilled in the art that the present invention provides a significant advance in the technology and art of room slideout systems. Particularly significant in this regard is the potential the invention affords for providing a high quality, low cost room slideout assembly of compact design. Additional features and advantages of various preferred embodiments will be better understood in view of the detailed description provided below.

Figure 1:
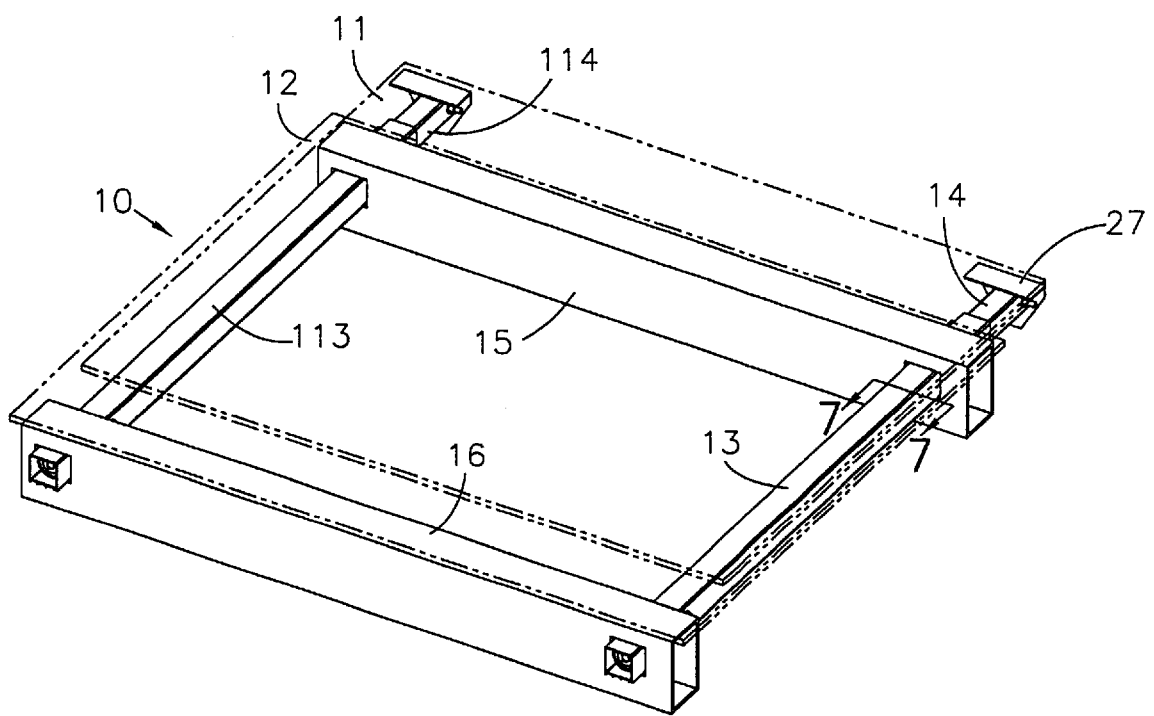
FIG. 1 is a perspective view, partially in phantom, of a preferred embodiment of the present invention, showing a room slideout system with a pair of drive screws in a partially extended position.

It should be understood that the appended drawings are not necessarily to scale, presenting a somewhat simplified representation of various preferred features illustrative of the basic principles of the invention. The specific design features of a drive screw room slideout device as disclosed here, including, for example, specific dimensions of the drive screw and the number of balls in the nut, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the room slideout assembly illustrated in the drawings. In general, front, extended or outboard refers to a right direction in the plane of the paper in FIG. 3, rear, retracted, or inboard refers to a left direction in the plane of the paper in FIG. 3.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved room slideout device disclosed here. The following detailed discussion of various alternative and preferred features and embodiments will illustrate the general principles of the invention with reference to a room slideout assembly for use with a recreational vehicle floor or the like. Other embodiments suitable for other applications will be apparent to those skilled in the art given the benefit of this disclosure.

Referring now to the drawings, FIG. 1 shows a perspective view of a room slideout assembly 10 in accordance with a preferred embodiment. A fixed floor 12 is supported by frame members 15, 16. A sliding element such as a bed or a sliding floor 11 is positioned over the fixed floor. In the preferred embodiment shown in FIG. 1, a pair of rams 14, 114 are driven between retracted and extended positions by a corresponding pair of screws 20, 120, seen in FIG. 6. Of course, for smaller applications only one ram/screw combination may be used. Outer housings 13, 113 surround and guide each corresponding ram 14, 114. The outer housings may extend between frame members 15, 16, and the rams 14, 114 extend through openings in each frame member. The outer housings can be mounted to either the fixed floor 12 or the frame members 15, 16, or both.

Figure 2:
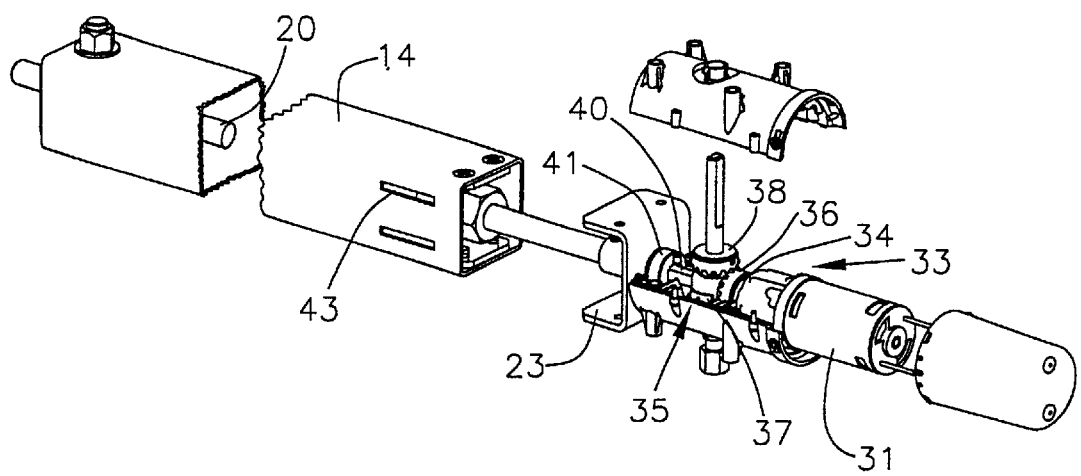
FIG. 2 is an exploded perspective view, partially cut away, in accordance with a preferred embodiment focusing on one of the drive screws, and a one 90 degree gearbox, one speed reducing gearbox and the motor, where each is rotatable along a first axis.

FIG. 2 shows an exploded view of a preferred embodiment of one of the ram/screw assemblies and the drive componentry attached thereto. Differences between each of the ram/screw assemblies, where they exist, are noted below.

Figure 3:
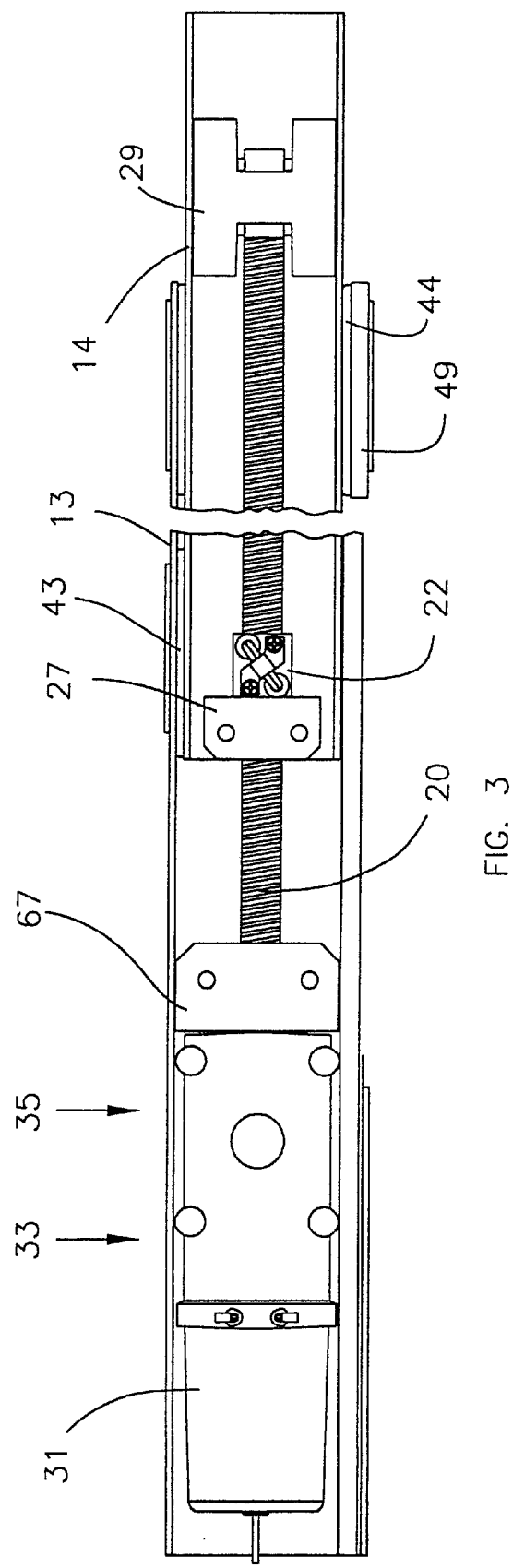
FIG. 3 is a side view of one of the ram/screw assemblies in a partially extended position, showing the location of the nut with respect to the drive screw.

A motor 31 is operatively connected to a speed reducing gearbox 33, which is in turn connected to a 90 degree gearbox 35. Preferably, the motor and the gearboxes 33, 35 are assembled together as a preassembled unit which can then be readily attached to a rigid member such as the outer housing 13. Motor 31 can have, for example, a motor output pinion 32 (best seen in FIG. 5) which is rotatable and engaged with the speed reducing gearbox 33. In FIG. 3, the 90 degree gearbox 35 is located between the speed reducing gearbox 33 and the drive screw 20. The speed reducing gearbox 33 has a gearbox output 34 which is rotatable and engaged with a coupling shaft assembly 40. The coupling shaft assembly 40 connects the speed reducing gearbox output 34 to screw 20, through connector 66 (shown in FIGS. 5 and 6). A first bevel gear 36 is mounted on the coupling shaft assembly 40 so as to rotate with both the coupling shaft assembly and the speed reducing gearbox output 34. Optionally a thrust bearing assembly 41 may be positioned to stabilize the coupling shaft assembly 40 and drive screw 20. The first gear 36 is preferably meshed with second gear 37 and third gear 38. The third gear 38 may be attached to a manual override assembly (not shown), for example.

Room slideout assemblies may be subjected to backdrive forces. Such backdrive forces would urge the drive screws to rotate, and in turn the gearboxes 33 and 35, overcoming the gear reduction ratios of such gearboxes and ultimately rotating an armature of motor 31. This could cause the sliding floor 11 to shift out of position. In accordance with a highly advantageous feature of at least certain preferred embodiments, the motor 31 may incorporate, where desirable, dynamic braking. Dynamic braking resists motion of the sliding floor 11 by resisting rotation of the armature. The term dynamic braking is understood by those skilled in the art of motor manufacturing to refer to a motor having an electric load connected across the armature. The motor may be actuated by a remote mounted switch (not shown) and wired so that when the switch is in a neutral position dynamic braking is engaged and when the switch is an on position dynamic braking is disengaged, the armature is electrified and the motor drives the drive screw or screws via the gearboxes. Such dynamic braking designs are preferable to add on mechanical motor brake designs in which a brake moves between engagement and disengagement with the motor in that they have fewer components and lower costs.

In accordance with a highly advantageous feature of at least certain preferred embodiments, the motor 31, speed reducing gearbox output 34, and shaft coupling assembly 40 rotates coaxially with the drive screw 20. The motor 31 has a pinion 32 (seen in FIG. 5) which rotates along a first axis, the motor pinion engages the speed reducing gearbox 33 which in turn engages gearbox output 34. The gearbox output 34 is then connected to screw 20 by coupling shaft assembly 40. Thus, each of the components of drive transmission are generally aligned together, greatly reducing space requirements for the overall assembly. In accordance with another highly advantageous feature, the screw 20, 90 degree gearbox 35, speed reducing gearbox 33 and motor are mounted within the outer housing 13 at motor mounting bracket 67, thereby further reducing overall space requirements for the room slideout assembly. Optionally for smaller slideouts, such as so-called bedroom slideouts where only one ram and drive screw is used, the speed reducing planetary gearbox may be mounted either coaxially with a drive screw or at right angles to the drive screw. The planetary gearbox can be attached to a first bevel gear 36 or a second bevel gear 37 meshed with the first bevel gear. The attachment point would depend on several factors, including ease of assembly and space constraints.

As the sliding floor is driven by the ram 14 to the extended position, the weight of the room slideout assembly will result in some friction between the ram and the outer housing. To counter this problem, low friction weight bearing elements such as top and bottom sliders 43, 44 are used. In the embodiment shown in FIG. 3, top slider 43 is attached to the ram. Top slider 43 is also visible in FIG. 2. As the ram travels, it slides over bottom slider 44. Bottom slider 44 is mounted on a slider housing 49 attached to the outer housing 13. It will be readily apparent to those skilled in the art, given the benefit of this disclosure, that other low friction bearing elements, such as rollers, may be used.

Figure 7:
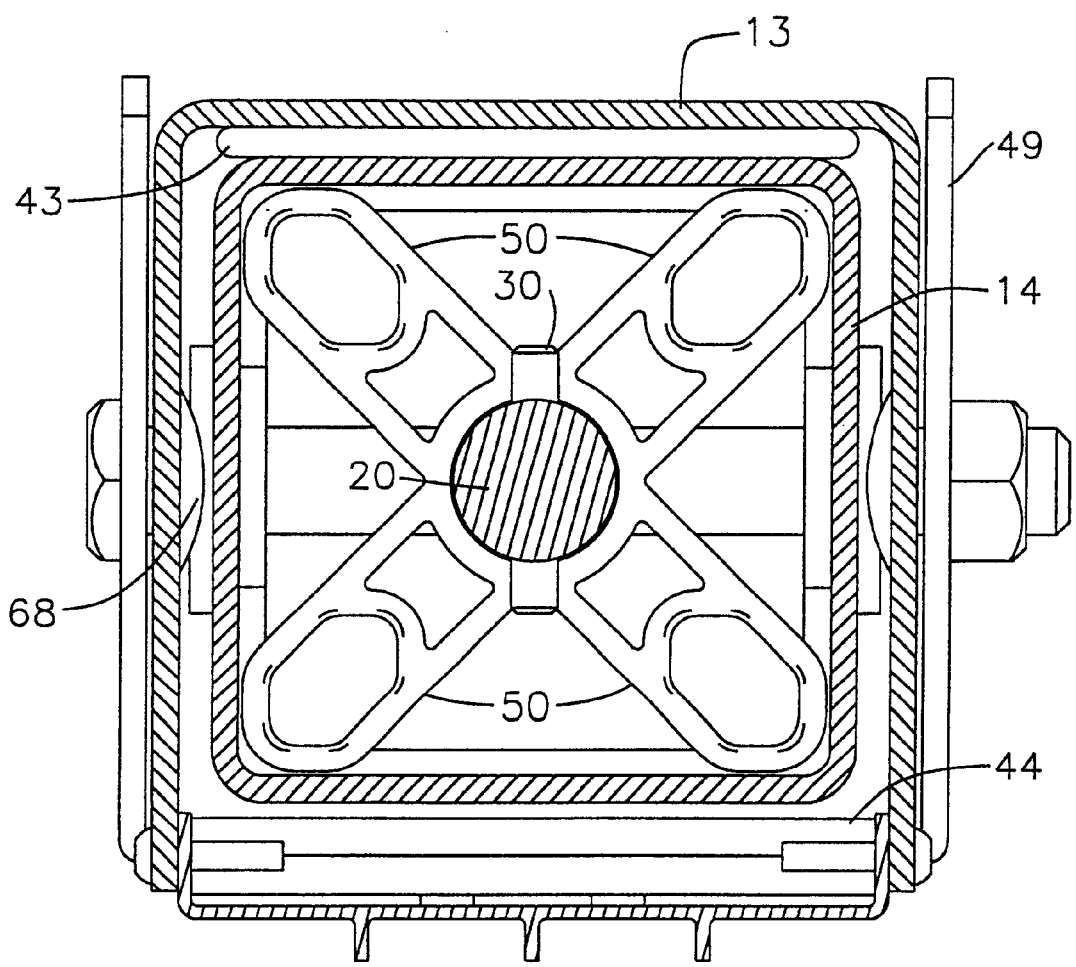
FIG. 7 is a section view taken along line 7—7 in FIG. 1 showing a pillow block.

FIGS. 3. and 7 show a pillow block 29. The pillow block is used to help stabilization of the corresponding screw as the rams travel between extended and retracted positions, and to space the drive screw 20 from the ram. The pillow block 29 is shown in FIG. 3 to be mounted near an extended or outboard end of drive screw 20. FIG. 7 is a cross section view of the pillow block 29. Internally threaded nut 22 which receives the threaded drive screw, nut flange or mounting bracket 23 and return tube 26 are also shown in FIG. 4 and are discussed in greater detail below.

As the drive screw 20 rotates, the ram translates. The pillow block 29 neither translates nor rotates even though it is mounted around the drive screw. Pillow block projections 50 abut against side walls of the ram 14 to restrict rotation of the pillow block 29, and pins 30 mounted on either side of the pillow block restrict translational motion of the pillow block with respect to the drive screw.

Figure 4:
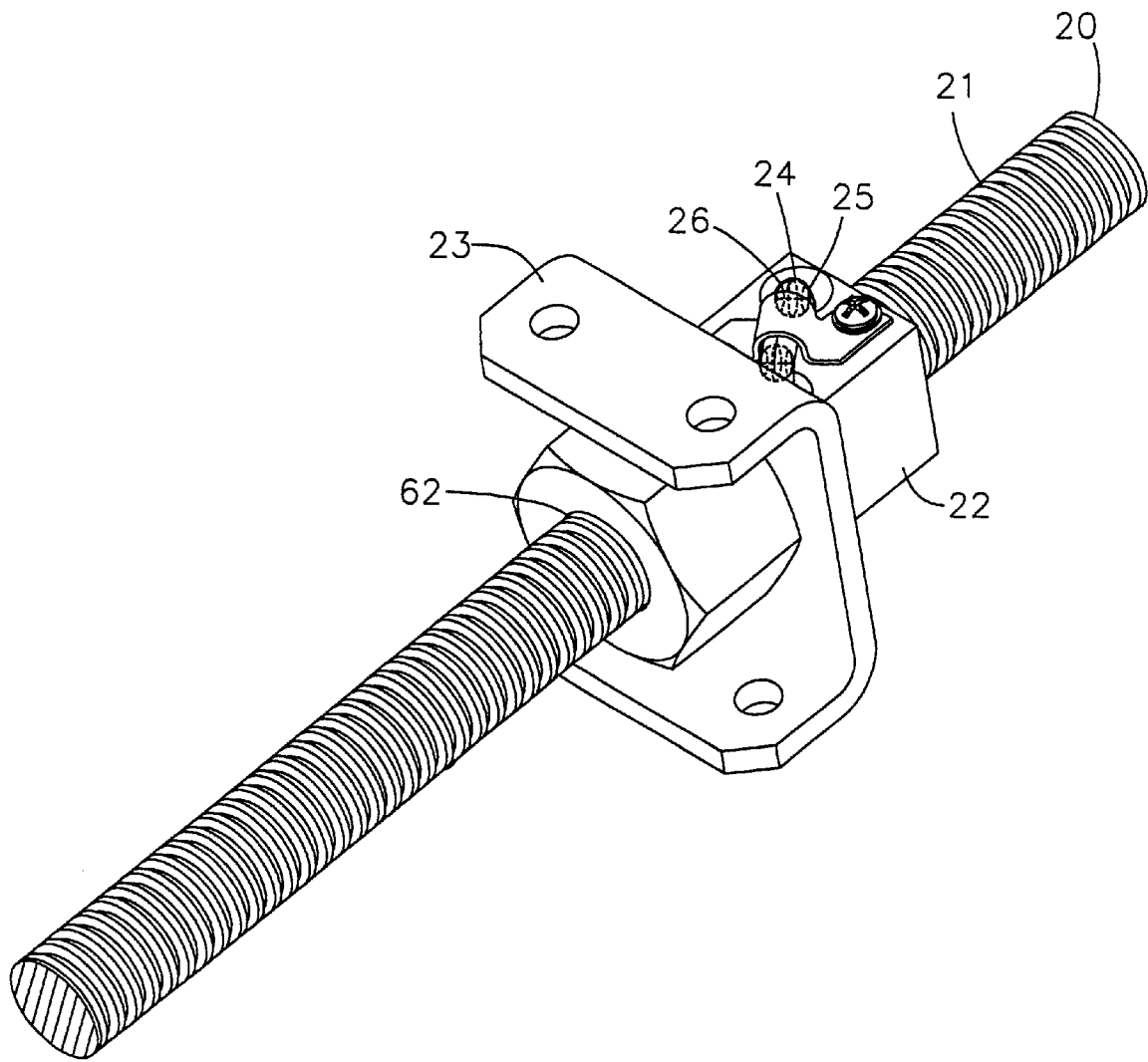
FIG. 4 is a perspective view of a nut and ball screw in accordance with a preferred embodiment.

FIGS. 3–4 show how the drive screw imparts motion to the sliding element 11. A nut 22 with internal threads receives the threads of the drive screw 20. A nut flange 23 is secured to the nut 22. The nut flange 23 can be directly attached to a sliding element or, as shown in the drawings at FIG. 3, attached to the ram 14, and ram 14 can be attached to the sliding floor 11 by a mounting bracket 27. As the ram 14 is driven from the retracted position to the extended position, the drive screw or screws are rotated by torsional force of the motor, and the screw(s) are subjected to compression loading. When the process is reversed and the rams returned from the extended position to the retracted position, the screw(s) are subjected to loading in tension. The axial loading is controlled by the use of the thrust bearing assembly 41, positioned adjacent mounting bracket 67, preferably on both sides of the mounting bracket to control loading in both compression and tension.

Drive screw 20 is preferably a standard acme screw or, as shown in the drawings, a ball screw. When a ball screw is used, preferably each ball screw 20, 120 has identically-handed threads 21, most preferably right handed threads. To help maintain a low friction surface and thereby reduce loading and wear on the motor, the threads of the screw may be protected by at least the following. The screw is formed of a heat treated steel of Rockwell hardness 56–62. The threads can be electropolished to smooth surfaces and remove impurities. After electropolishing, the drive screw is electroplated with zinc or other suitable material and a lubricant is applied to the drive screw. The nut has an channel which cooperates with the threads 21 of the ball screw 20 and the threads of the nut 62 to define a ball raceway 25. A plurality of balls 24 are positioned within the raceway. As the screw rotates with respect to the nut 22, the balls tend to travel along the threads, 21, 62. A return tube 26 is provided, returning the balls to the raceway 25. In this manner the balls continuously provide low friction contact and load transmission between the screw and the nut.

Figure 5:
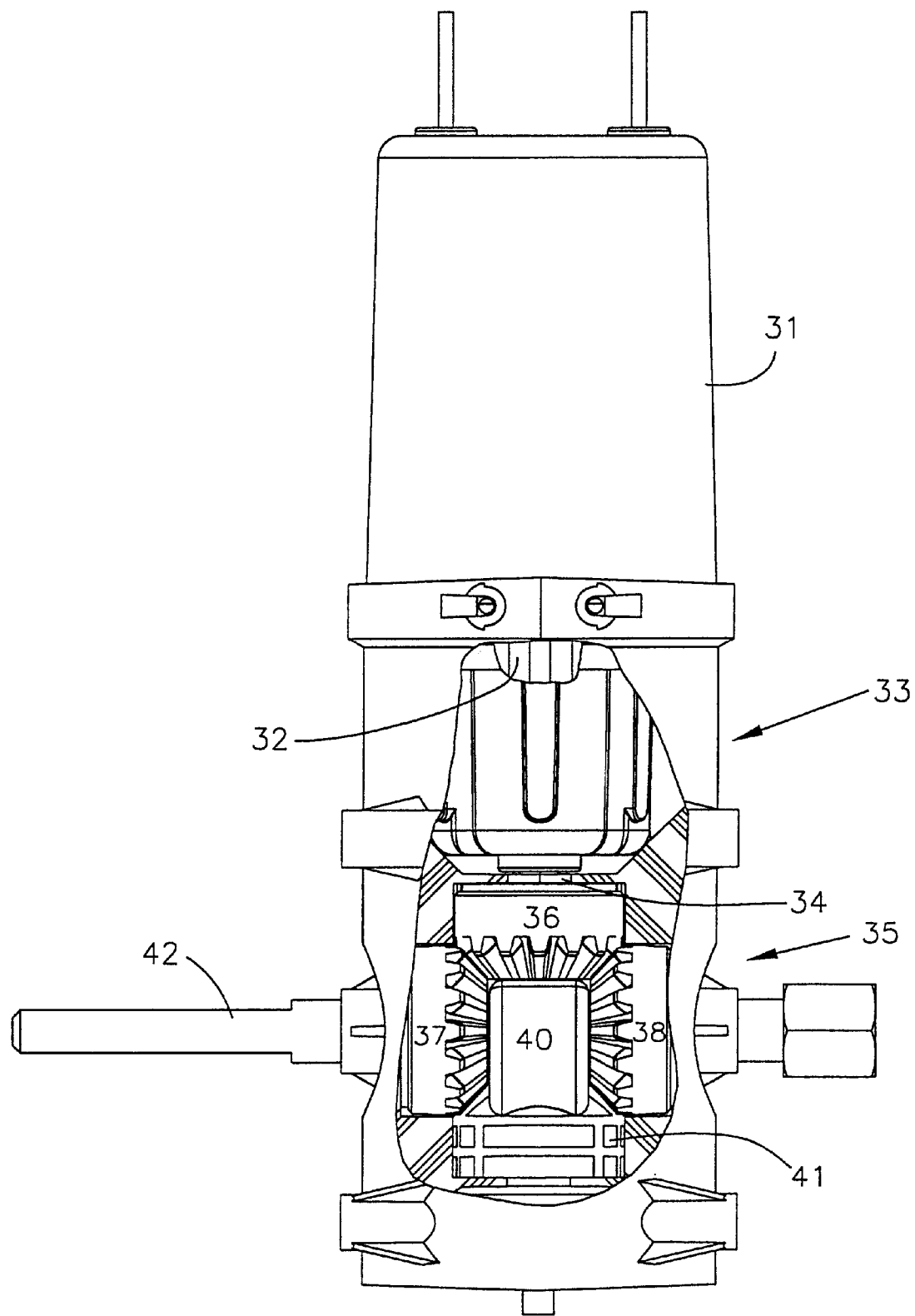
FIG. 5 is a top view of the 90 degree gearbox with an external wall of the gearbox partially removed, showing bevel gears in accordance with a preferred embodiment.
Figure 6:
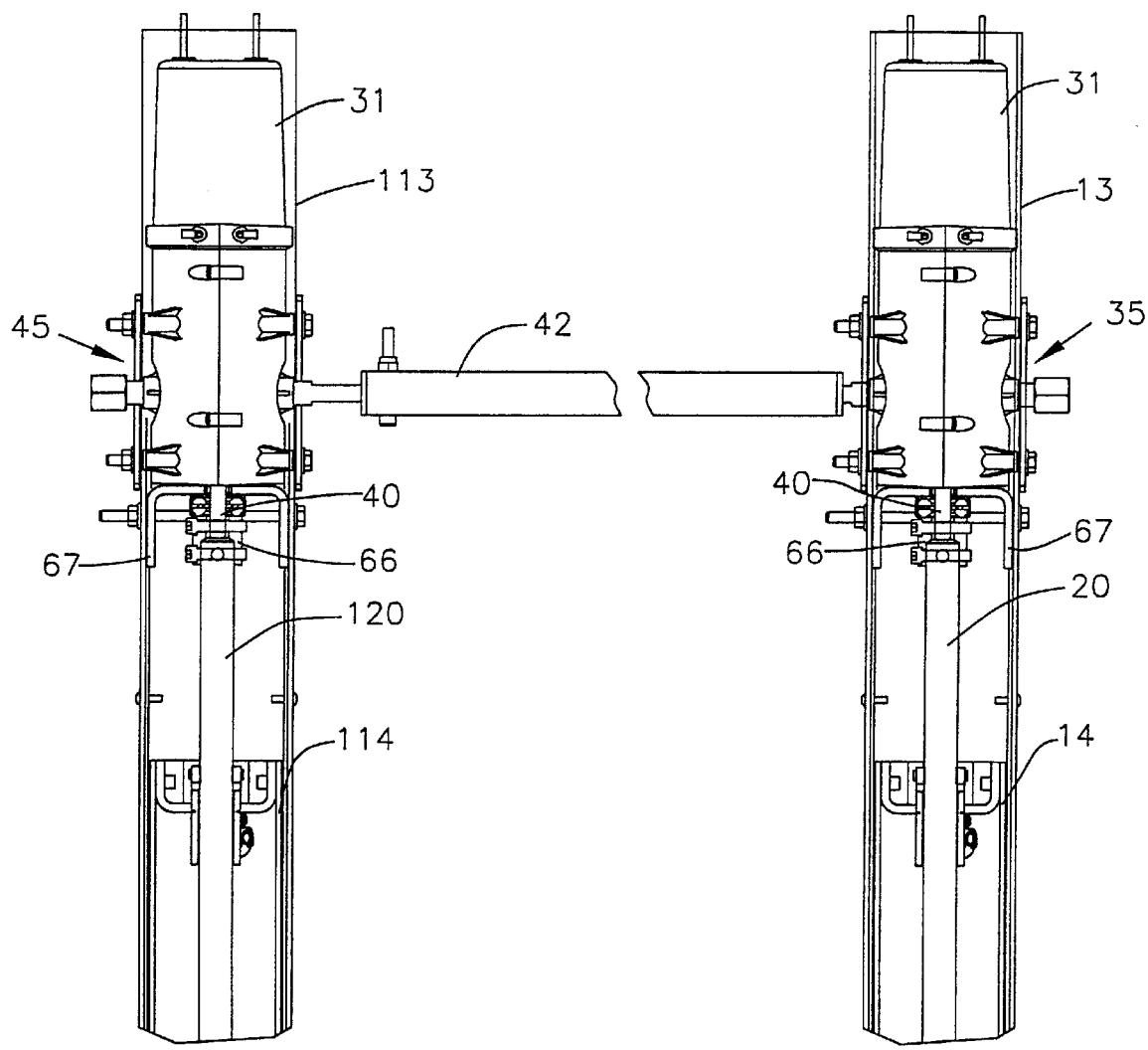
FIG. 6 is a top view of the cross shaft connecting the 90 degree gearboxes together.

As seen in FIG. 5, first 90 degree gearbox 35 has a first bevel gear 36 rotatable about the first axis, a second bevel gear 37 meshing with the first bevel gear 36 and so, positioned at a generally right angle to the first bevel gear 36, and a third bevel gear 38 meshing with the first bevel gear 36 and rotatable with the second bevel gear is a direction generally perpendicular to the first axis. As seen in FIG. 6, cross shaft 42 connects the 90 degree gearboxes 35, 45 together so that the rams 14, 114 travel together, thereby avoiding potential problems with misalignment such as binding and improper sealing. Advantageously, with such a design one motor may be used to rotate both drive screws 20, 120 in a synchronized manner and therefore drive both rams together. The second 90 degree gearbox 45 is preferably essentially identical to the first 90 degree gearbox 35, and is provided with three bevel gears. However, as discussed above it is preferable that both screws have right handed threads, to aid in commonization of parts. Therefore, the bevel gears of gearbox 45 have been repositioned to ensure synchronized motion. The cross shaft 42 connects the second gear 37 to a corresponding bevel gear of the second 90 degree gearbox so that these gears rotate together. Of course, no speed reducing gearbox is required to be connected to the second 90 degree gearbox unless a second motor is used.

In certain alternate preferred embodiments the cross shaft can be eliminated and electronic or electromechanical controls can be used to coordinate rotation of each motor.

Figure 8:
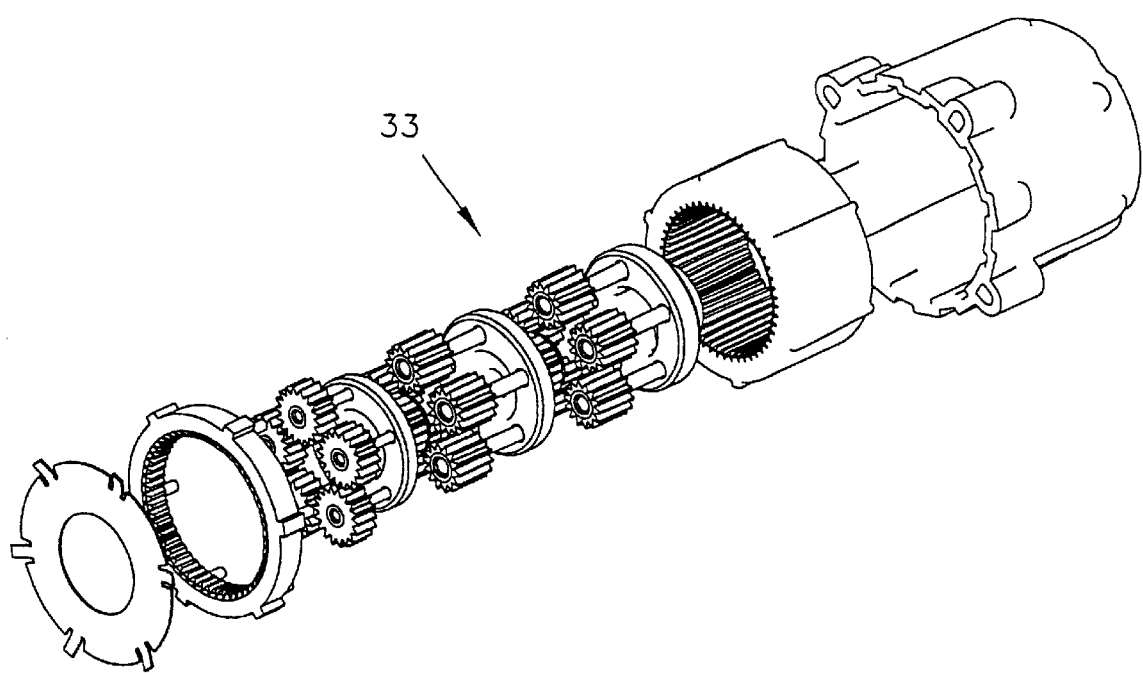
FIG. 8 is an exploded perspective view of a preferred embodiment of the speed reducing gearbox.

FIG. 8 is an exploded perspective view of a preferred embodiment of the speed reducing gearbox 33, shown as a planetary gearbox with three sets of sun, ring and planet gears so that the overall speed reduction between the motor output shaft and the speed reducing gearbox output shaft is on the order of approximately 50–60 to 1. Other speed reducing gearbox configurations will be readily apparent to those skilled in the art given the benefit of this disclosure.

In certain alternate preferred embodiments, the motor may be rotated 90 degrees to optimize space under the fixed floor. Such a design may be preferable in so-called bedroom slideouts, which typically only use one drive screw and ram, and are smaller than full room slideout assemblies. In such an embodiment the planetary gearbox would be attached to a bevel gear extending at right angles to the first axis around which the drive screw rotates.

Figure 9:
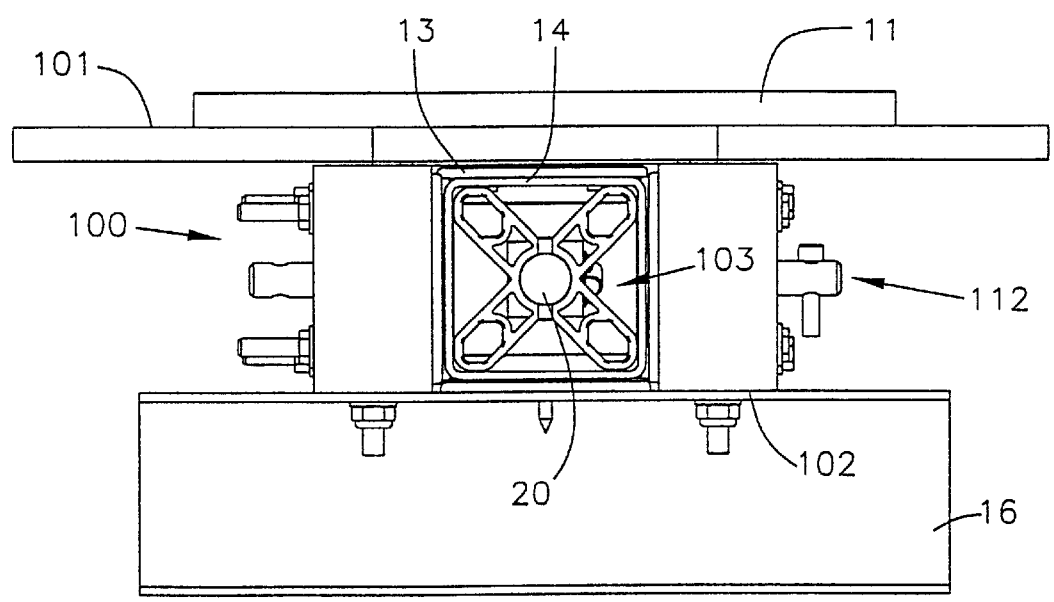
FIG. 9 is a side view of an alternative preferred embodiment, showing an in-floor drive screw room slideout system with a ram positioned above a structural frame.

FIG. 9 is a side view on an alternative preferred embodiment where an outer housing is eliminated. Such an in-floor room slideout assembly 100 has a fixed floor or support 112 with a walking or top surface 101 and an underside 102. Channel 103 is formed within fixed floor 112 and a ram 14 extends through the channel. The drive screw 20 drives the ram in a manner similar to that shown in the previous embodiments, except that the rams are positioned above the frame member 16 and do not extend through the frame member. Such a design incorporates the outer housing into the fixed floor. Since the ram is positioned above the frame, this design advantageously eliminates the need to cut out holes in the frame members.

From the foregoing disclosure and detailed description of certain preferred embodiments, it will be apparent that various modifications, additions and other alternative embodiments are possible without departing from the true scope and spirit of the invention. For example it will be apparent to those skilled in the art, given the benefit of this disclosure, that rollers instead of sliders may be used as low friction bearing elements. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A room slideout assembly comprising, in combination:
    a motor having a motor output pinion rotatable about a first axis;
    a drive screw operatively connected to the motor and rotatable by the motor about the first axis;
    an elongate ram, adapted to be attached to a sliding floor, the ram being movable along the first axis between extended and retracted positions in response to rotation of the drive screw; and
    an internally threaded nut attached to the ram and internally receiving the drive screw, wherein rotation of the drive screw urges the nut to move along the first axis and the nut cooperates with the drive screw to form a ball raceway, and a plurality of balls are positioned in the ball raceway.

2. The room slideout assembly of claim 1 wherein the drive screw is positioned within the ram.

3. The room slideout assembly of claim 1 further comprising a return tube which cooperates with the ball raceway to form a closed loop, and the plurality of balls provide low friction load transmission between the drive screw and the nut.

4. The room slideout assembly of claim 1 further comprising a pillow block radially spacing the drive screw from the ram.

5. The room slideout assembly of claim 4 wherein the ram has side walls and the pillow block has projections which abut against each of the side walls to restrict rotation of the pillow block with respect to the elongate ram.

6. The room slideout assembly of claim 1 further comprising a support frame and an outer housing attached to the support frame, wherein the ram is movable between the retracted and extended positions within the outer housing.

7. The room slideout assembly of claim 6 further comprising a top slider and a bottom slider, wherein the sliders cooperate to provide low friction sliding contact between the ram and the outer housing.

8. The room slideout assembly of claim 6 further comprising a fixed floor, wherein the fixed floor and the outer housing are mounted on the frame, and the ram is connected to a sliding floor.

9. The room slideout assembly of claim 8 wherein the outer housing extends through an opening in the frame.

10. The room slideout assembly of claim 6 further comprising a speed reducing gearbox operatively connected to the motor, wherein the motor and the speed reducing gearbox are positioned within the outer housing.

11. The room slideout assembly of claim 6 further comprising a 90 degree gearbox operatively connected to the drive screw, wherein the motor and the 90 degree gearbox are positioned within the outer housing.

12. The room slideout assembly of claim 1 further comprising a speed reducing gearbox having an output rotatable about the first axis, wherein the speed reducing gearbox is operatively connected between the motor and the drive screw.

13. The room slideout assembly of claim 12 further comprising a 90 degree gearbox operatively interconnected between the speed reducing gearbox and the drive screw, the 90 degree gearbox comprising a first gear rotatable around the first axis in response to rotation of the speed reducing gearbox output, and a second gear meshed with the first gear and rotatable around an axis generally perpendicular to the first axis.

14. The room slideout assembly of claim 13 further comprising a coupling shaft assembly operatively connecting the first gear to the drive screw.

15. The room slideout assembly of claim 1 wherein the motor has dynamic braking for resisting rotation of the motor output pinion when the motor is not actuated.

16. A room slideout assembly comprising, in combination:
    a motor having a motor output pinion rotatable about a first axis;
    a first drive screw rotatable about the first axis;
    a first 90 degree gearbox operatively connecting the motor to the first drive screw, wherein the motor urges the first drive screw to rotate, the first 90 degree gearbox having a first output member rotatable with the first drive screw about the first axis and a second output member which rotates perpendicular to the first drive screw;
    a drive nut internally receiving the drive screw, wherein rotation of the drive screw urges the nut to move along the first axis; and
    an elongate ram having side walls defining a central opening, the ram being adapted to be attached to a sliding floor, and movable between extended and retracted positions in response to rotation of the first drive screw;
    wherein the drive nut and the drive screw are both positioned within the central opening of the elongate ram when the ram is in the retracted position.

17. The room slideout assembly of claim 16 further comprising:
    a second drive screw, rotatable about a second axis generally parallel to the first axis;
    a second ram adapted to be attached to a sliding floor, the second ram being movable with the first ram between the extended and retracted positions in response to rotation of the second drive screw;
    a second 90 degree gearbox; and
    a cross shaft rotatable by operation of the motor and connecting the output member of the first 90 degree gearbox to the second 90 degree gearbox, such that in response to the motor the first drive screw and the second drive screw are synchronized to rotate in the same direction.

18. The room slideout assembly of claim 17 wherein the first drive screw and second drive screw have identically handed threads.

19. A room slideout assembly comprising, in combination:
    a motor;
    a first 90 degree gearbox comprising
        a first gear operatively connected to the motor,
        a second gear meshed with the first gear; and
        an output member meshed with the first gear, coaxial with the second gear and adapted to rotate in response to a manual override assembly;
    a cross shaft attached to the second gear;
    a second 90 degree gearbox comprising
        a third gear, and
        a fourth gear meshed with the third gear and attached to the cross shaft;

a first drive screw operatively connected to the first 90 degree gearbox, rotatable by operation of the motor;

a second drive screw operatively connected to the second 90 degree gearbox, rotatable by operation of the motor;

an elongate first ram, adapted to be attached to a sliding floor, the first ram being movable in response to rotation of the first drive screw; and an elongate second ram, adapted to be attached to a sliding floor, the second ram being movable in response to rotation of the second drive screw.

20. The room slideout assembly of claim 19 wherein the first drive screw is operatively connected to the first gear of the first gearbox, and the second drive screw is operatively connected to the third gear of the second gearbox.

21. The room slideout assembly of claim 19 wherein the first gear of the first gearbox rotates in the same direction as the third gear of the second gearbox.

22. The room slideout assembly of claim 19 wherein the gears of the first and second 90 degree gearboxes are bevel gears.

23. The room slideout assembly of claim 19 further comprising a rotatable output of a speed reducing gearbox rotatable by the motor, wherein the output extends from the speed reducing gearbox and is operatively interconnected to the first gearbox.

24. The room slideout assembly of claim 23 wherein the ratio of speed of the motor to the rotatable output of the speed reducing gearbox is approximately 50–60 to 1.

25. A room slideout assembly comprising, in combination:

a motor;

a drive screw operatively connected to the motor and rotatable by the motor;

an elongate ram attached to a sliding floor, the ram being movable between retracted and extended positions in response to rotation of the drive screw;

a structural frame provided with a pair of elongate beams extending perpendicular to the ram;

a fixed floor mounted between the structural frame and the sliding floor, provided with an elongate channel, wherein the ram is positioned within the elongate channel and above the structural frame when the ram is in the retracted position, and the fixed floor is positioned entirely below the sliding floor.

26. The room slideout assembly of claim 25 wherein the fixed floor has a walking surface and an underside, and the elongate channel opens on the underside of the fixed floor.

27. A room slideout assembly comprising, in combination:

a motor;

a speed reducing planetary gearbox rotatable by the motor and provided with a rotatable gearbox output;

a 90 degree gearbox comprising at least first and second meshed bevel gears, wherein the first bevel gear is operatively connected to the rotatable gearbox output and one of the first and second bevel gears is rotatable about a first axis; and an elongate ram, adapted to be attached to a sliding floor, wherein the ram is operably connected to the planetary gearbox by a drive screw so that rotation of the planetary gearbox output urges the ram to translate along the first axis between extended and retracted positions;

a support frame and an outer housing attached to the support frame and provided with a central opening, wherein the drive screw is positioned entirely within the central opening of the outer housing and the elongate ram has a length at least half the length of the outer housing.

28. The room slideout assembly of claim 27 further comprising:

a drive screw rotatable by the planetary gearbox output shaft around the first axis; and an internally threaded nut affixed to the ram, wherein the drive screw is positioned within the nut so that rotation of the drive screw urges the nut to translate along the first axis.

29. The room slideout assembly of claim 27 wherein the first bevel gear is rotatable about the first axis.

30. The room slideout assembly of claim 27 wherein the second bevel gear is rotatable about the first axis.

* * * * *